(No Model.)
A. AMERMAN.
Bottom or Curb for Grain and Hay Stacks.
No. 243,190. Patented June 21, 1881.
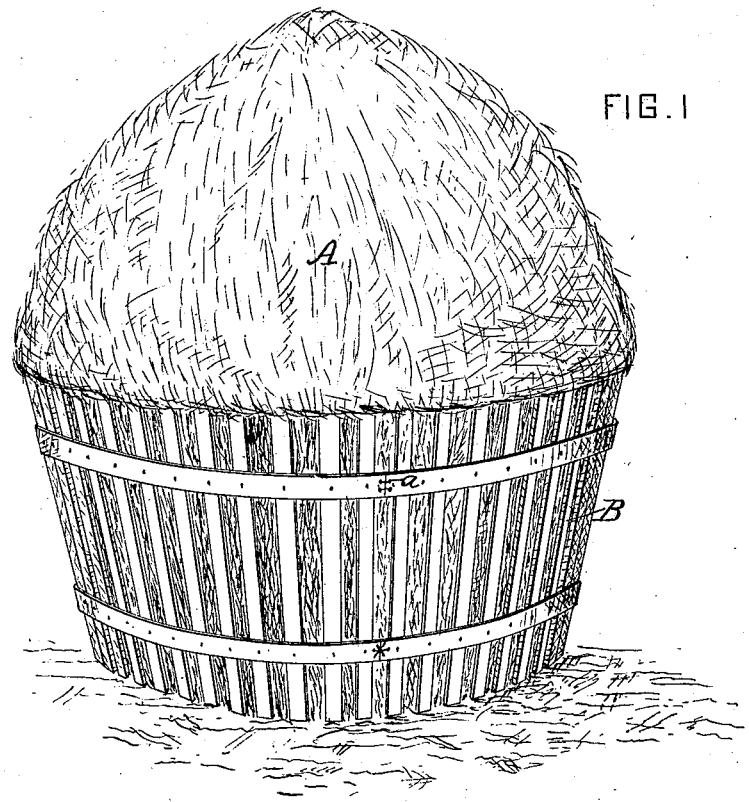
FIG.1
FIG.2
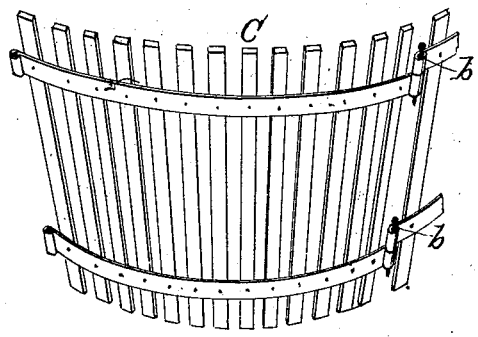
FIG.3
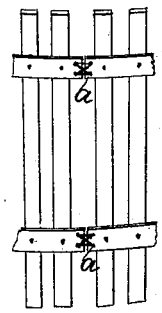
WITNESSES:
Wm. J. Johnston
Chas. G. Page.
INVENTOR
Albert Amerman
By E. J. Underwood
Attorney

UNITED STATES PATENT OFFICE.

ALBERT AMERMAN, OF NEW ULM, ASSIGNOR OF ONE-HALF TO ELIZABETH S. BARTLEY, OF BIRCH COOLEY, MINNESOTA.

BOTTOM OR CURB FOR GRAIN AND HAY STACKS.

SPECIFICATION forming part of Letters Patent No. 243,190, dated June 21, 1881.

Application filed April 4, 1881. (No model.)

To all whom it may concern:

Be it known that I, ALBERT AMERMAN, a citizen of the United States, residing at New Ulm, in the county of Brown and State of Minnesota, have invented certain new and useful Improvements in Stack-Bottoms for Grain and Hay Stacks; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to stack-bottoms for grain and hay stacks; and it consists in a circular or oblong flaring form, curb, or cage, constructed of a series of vertical or horizontal strips of wood or metal held in place by encircling hoops or bands of strap-iron, wire, or wood, for the purpose of retaining the stack in shape and position during and after the process of building, and the said bottom or curb may be superimposed over a platform of simple construction to prevent moisture being taken up into the stack.

In the drawings, in which similar letters of reference indicate like parts in the several figures, Figure 1 represents my completed stack-bottom as in use. Fig. 2 shows a section of the stack-bottom, and the manner of connecting the sections to construct the completed form. Fig. 3 is a detail view, showing another manner of connecting the sections.

A is the stack of hay or grain, represented as completed and inclosed in the circular bottom or form B, which is composed of the several sections, C, connected by wires passing through holes a, (shown in Figs. 1 and 3,) or by pins b, as shown in Fig. 2.

I have represented my stack-bottom as constructed of sections of wooden strips four inches wide, one inch thick, and six or seven feet long, encircled by hoops of ordinary strap-iron bolted or riveted to the strips, which sections when connected form a circular curb or cage; but it is obvious that both dimensions and shape may be varied; but I also construct my sections of metallic strips, or of iron rods connected by bands, or of wooden rods having wires looped around each, or passing through them, and thus connecting them together and forming the shape or bottom of the stack. When the several sections are connected they form a circular frame or curb, having usually a diameter of about twelve feet at the bottom and eighteen feet at the top; but I do not wish to limit myself to these dimensions.

For convenience in packing and shipping I construct my stack-bottoms in sections, as represented in Figs. 2 and 3, and connect the several sections to form the circular or oblong curb or cage, either by wiring together through the holes a in the ends of the bands or by hooks and staples or other analogous manner. One method of connection is to have the bands of each alternate section raised an inch or two, and the extremities of the bands bent into loops, so that pins can be passed through and connect the sections, as shown in Fig. 3, and I can also construct my cages in one piece.

By the use of my stack-bottoms I am enabled to give grain-stacks a more symmetrical shape, which insures a regular pitch to the layers of grain or bundles, thereby preventing leakage and the consequent damage and destruction of grain from molding or heating.

In making a stack in the ordinary way great care and experience are required to keep the sides even and the center of the stack full, else when the stack is half or two-thirds completed one side will sink and the grain or hay be canted to the ground; but by the use of my form this difficulty is obviated, for as fast as the grain or hay is unloaded and received, even by the most inexperienced stacker, it will take the proper shape, and cannot be other than regular. Another difficulty in the common method of stacking is that the sides of the stack settle unevenly, and cause leakage and the destruction of a part or the whole of the contents of the stack. By the use of my improved forms this is entirely obviated, as it is impossible for the stack to settle irregularly.

Again, the stacks made by the use of my bottoms or forms are uniform in size, and the contents can be measured with precision and certainty. Another advantage arising from the use of my invention is preventing the destruction of the stacked grain by cattle at large in the field.

The strips composing the cage may be placed so near each other that animals in the field after the grain is stacked cannot destroy the contents nor undermine the structure of the stack.

If desired to be used to feed cattle or sheep the strips can be arranged far enough apart to allow them to eat without waste.

Having thus described my invention, what I claim as new therein, and desire to secure by Letters Patent, is—

1. A receptacle for holding, retaining in symmetrical form, and protecting a stack of hay or grain, consisting of an upwardly-flaring symmetrical inclosure, substantially as described, and for the purpose specified.

2. The stack-holder and protector herein described, consisting of the upwardly-flaring inclosing wall or cage constructed in sections, detachably secured together, all as described.

In testimony whereof I have affixed my signature in presence of two witnesses.

ALBERT AMERMAN.

Witnesses:
JONAS LAUDENSCHLAGER,
ALBERT HAGBERG.